| (12) United States Patent | (10) Patent No.: US 11,336,335 B2 |
| Wu et al. | (45) Date of Patent: May 17, 2022 |

(54) TERMINAL DEVICE AND PROTECTIVE SHELL

(71) Applicant: BEIJING XIAOMI MOBILE SOFTWARE CO., LTD., Beijing (CN)

(72) Inventors: Kaiqi Wu, Beijing (CN); Yibo Xue, Beijing (CN); Yanteng Wang, Beijing (CN)

(73) Assignee: Beijing Xiaomi Mobile Software Co., Ltd, Beijing (CN)

( * ) Notice: Subject to any disclaimer, the term of this patent is extended or adjusted under 35 U.S.C. 154(b) by 114 days.

(21) Appl. No.: 16/661,611

(22) Filed: Oct. 23, 2019

(65) Prior Publication Data

US 2020/0350956 A1 Nov. 5, 2020

(30) Foreign Application Priority Data

Apr. 30, 2019 (CN) .......................... 201910363787.0

(51) Int. Cl.
*H04B 5/00* (2006.01)
*H01R 13/6591* (2011.01)
*H02J 7/00* (2006.01)
*H02J 7/02* (2016.01)

(52) U.S. Cl.
CPC ....... *H04B 5/0087* (2013.01); *H01R 13/6591* (2013.01); *H02J 7/0044* (2013.01); *H02J 7/025* (2013.01); *H04B 5/0037* (2013.01)

(58) Field of Classification Search
CPC ................ H04B 5/0087; H04B 5/0037; H01R 13/6591; H02J 7/0044; H02J 7/025
USPC ......................................................... 307/104
See application file for complete search history.

(56) References Cited

U.S. PATENT DOCUMENTS

| 2011/0050164 | A1 | 3/2011 | Partovi et al. | |
| 2013/0093388 | A1 | 4/2013 | Partovi | |
| 2013/0260677 | A1 | 10/2013 | Partovi | |
| 2014/0091758 | A1 | 4/2014 | Hidaka et al. | |
| 2015/0280450 | A1* | 10/2015 | Park ...................... | H02J 50/402 307/104 |
| 2016/0172896 | A1 | 6/2016 | Hidaka et al. | |
| 2018/0159372 | A1 | 6/2018 | Hidaka et al. | |
| 2018/0175668 | A1 | 6/2018 | Hidaka et al. | |
| 2018/0219427 | A1* | 8/2018 | Baek ...................... | H05K 1/189 |

(Continued)

FOREIGN PATENT DOCUMENTS

| EP | 2712053 A1 | 3/2014 |
| WO | 2019050157 A1 | 3/2019 |

OTHER PUBLICATIONS

Extended European Search Report in the European Application No. 19208610.6, dated Dec. 19, 2019, (12p).

*Primary Examiner* — Michael R. Fin
(74) *Attorney, Agent, or Firm* — Arch & Lake LLP (57) ABSTRACT

The present disclosure provides a terminal device and a protective shell, and belongs to the technical field of communication. The terminal device includes a body, a first coil, a second coil and a shielding member. The body includes a rear shell. The first coil is located in the body. The second coil is located in the body and close to one side of the rear shell, and the second coil at least partially overlaps the first coil. The shielding member covers the sides, far away from the rear shell, of the first coil and the second coil, and is located outside an overlapping portion of the first coil and the second coil, and the first coil is unshielded from the second coil.

14 Claims, 10 Drawing Sheets

(56) References Cited

U.S. PATENT DOCUMENTS

2018/0375378 A1 12/2018 Hidaka et al.
2020/0267834 A1* 8/2020 Lee .................. H01Q 1/243
2020/0373784 A1* 11/2020 Yun .................. G06F 1/1635

* cited by examiner

TERMINAL DEVICE AND PROTECTIVE SHELL

CROSS-REFERENCE TO RELATED APPLICATION

The present application claims benefit of Chinese Patent Application No. 201910363787.0, filed on Apr. 30, 2019, the contents of which are hereby incorporated by reference in their entirety.

TECHNICAL FIELD

The present disclosure generally relates to the technical field of communication, and more particularly, to a terminal device and a protective shell.

BACKGROUND

With the rapid development of communication technologies, terminal devices have realized functions, such as wireless charging, Near Field Communication (NFC), through coils. Take a wireless charging coil and an NFC coil, for instance, shield member is arranged on the wireless charging coil and the NFC coil, respectively, to shield off interference. However, in the case that the wireless charging coil overlaps the NFC coil, the shielding member of the wireless charging coil or the shielding member of the NFC coil may affect the normal work of the other coil.

SUMMARY

The present disclosure provides a terminal device and a protective shell, which may avoid interference to an overlapping portion of a coil.

According to a first aspect of the present disclosure, a terminal device is provided, which may include: a body, including a rear shell; a first coil, located within the body; a second coil, located within the body and adjacent to one side of the rear shell, the second coil at least partially overlapping with the first coil; and a shielding member, covering the sides, far away from the rear shell, of the first coil and the second coil and located outside an overlapping area between the first coil and the second coil. There is no shield between the first coil and the second coil.

According to a second aspect of the present disclosure, a terminal device is provided, which may include: a body including a rear shell; a first coil, located within the body; a shielding member, covering the side, far away from the rear shell, of the first coil, there being no shield between the first coil and other coil; and a first wireless charging interface, formed in the body and configured to receive a current from a wireless charging coil and/or configured to send a current to the wireless charging coil.

According to a third aspect of the present disclosure, a protective shell is provided, which may include: a shell including an outer surface; a wireless charging coil, located within the shell and adjacent to a side of the outer surface; a shielding member, covering the side, far away from the outer surface, of the wireless charging coil, the coverage of the shielding member being located in a working face of the wireless charging coil and outside an overlapping area between the wireless charging coil and other coil, and there being no shield between the wireless charging coil and the other coil; and a second wireless charging interface, formed in the shell and configured to receive a current from the wireless charging coil and/or configured to send a current to the wireless charging coil.

It should be understood that the above general descriptions and detailed descriptions below are only exemplary and explanatory and not intended to limit the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific examples and not intended to limit the present disclosure. Unless otherwise defined, the technical terms or scientific terms used in the present disclosure should be understood normally by those of ordinary skill in the art of the present disclosure. "First", "second" and similar terms used in the specification and claims of the present disclosure are adopted not to represent any sequence, number or importance but only to distinguish different parts. Similarly, similar terms such as "one" or "a/an" also do not represent a number limit but only represent existence of at least one. Unless otherwise specified, terms like "include" or "contain" refer to that an element or object appearing before "include" or "contain" covers an element or object and equivalent thereof listed after "include" or "contain" and does not exclude another element or object. Similar terms such as "connect" or "interconnect" are not limited to physical or mechanical connection, and may include electrical connection, either direct or indirect.

It shall be understood that, "A/an", "said" and "the" in a singular form in the specification and appended claims of the present disclosure are also intended to include a plural form, unless other meanings are clearly denoted throughout the present disclosure. It is also to be understood that term "and/or" used in the present disclosure refers to and includes one or any or all possible combinations of multiple associated items that are listed.

In some examples, a terminal device includes a body, a first coil and a second coil. The body includes a rear shell. Both the first coil and the second coil are arranged in the body, and the first coil is further away from the rear shell than the second coil. Along a direction towards the rear shell, at least a portion of the second coil overlaps with the first coil. The first coil is covered with a first shielding member, and the second coil is covered with a second shielding member. In an overlapping area between the first coil and the second coil, the second shielding member is partially located in the overlapping portion of the first coil and the second coil, which may achieve an interference shielding effect on the first coil to affect normal work of the first coil. The examples of the present disclosure provide a terminal device and a protective shell.

Figure 1:
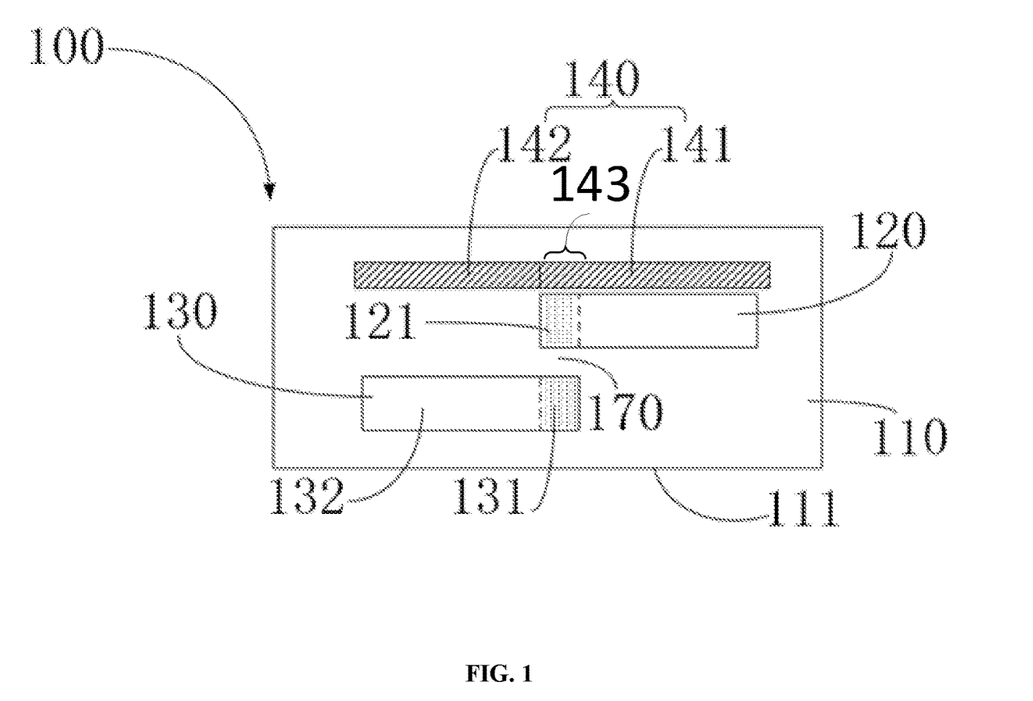
FIG. 1 is a cross-sectional view of a terminal device, according to an example of the present disclosure.

According to the first aspect of the examples of the present disclosure, a terminal device is provided. FIG. 1 shows a cross-sectional view of terminal device 100 and includes a body 110, a first coil 120, a second coil 130 and a shielding member 140. The body 110 includes a rear shell 111, the first coil 120 is located in the body 110. The second coil 130 is located in the body 110 adjacent to the side of the rear shell 111. The second coil 130 at least partially overlaps with the first coil 120. The shielding member 140 covers the sides, far away from the rear shell 111, of the first coil 120 and the second coil 130, and is located outside an overlapping area 170 between the first coil 120 and the second coil 130. There is no shield between the first coil 120 and the second coil 130.

It is to be noted that the state that the second coil 130 at least partially overlaps with the first coil 120 refers to that, along a direction towards the rear shell 111, the second coil 130 at least partially overlaps with the first coil 120.

According to the terminal device 100 provided in the examples of the present disclosure, the shielding member 140 covers the sides, far away from the rear shell 111, of the first coil 120 and the second coil 130, to implement shielding protection for the first coil 120 and the second coil 130. In addition, the shielding member 140 is located outside the overlapping area 170 between the first coil 120 and the second coil 130, and there is no shield between the first coil 120 and the second coil 130, so that overlapping portions 121, 131 of the first coil 120 and the second coil 130 may be prevented from interference of the shielding member 140. Moreover, in the examples of the present disclosure, no shielding member 140 is arranged between overlapping portions 121, 131 of the first coil 120 and the second coil 130, so that it possible to reduce an amount of a shielding material used, and cost may be reduced.

In the examples of the present disclosure, the terminal device 100 may be a mobile phone, a digital broadcast terminal, a messaging device, a gaming console, a tablet, a medical device, exercise equipment, a personal digital assistant and the like.

The body 110 may include a middle frame and the rear shell 111. A display surface is arranged on a front surface of the middle frame. The rear shell 111 covers a back surface of the middle frame. A cavity for accommodating components, such as the first coil 120, the second coil 130 and the shielding member 140, is formed between the middle frame and the rear shell 111.

Both the first coil 120 and the second coil 130 may be metal wires or metal windings, and both may be functional coils. For example, the first coil 120 may be an NFC coil, and the second coil 130 may be a wireless charging coil.

A material for the shielding member 140 may be a magnetic shielding material such as a nanocrystalline material, a ferrite material and an amorphous material, to endow the shielding member 140 with a magnetic shielding function.

In the examples of the present disclosure, the second coil 130 at least partially overlaps with the first coil 120 along the direction towards the rear shell 111 of the body 110 include the following two examples.

Figure 2:
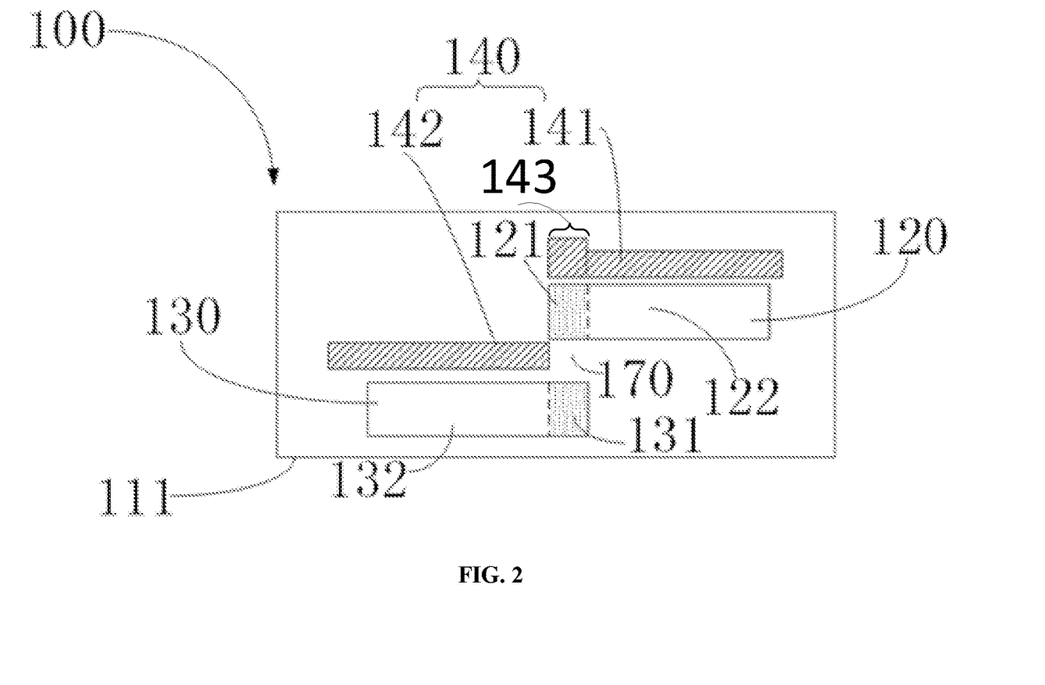
FIG. 2 is a cross-sectional view of a terminal device, according to an example of the present disclosure.

As a first example, as shown in FIG. 1 or FIG. 2, the second coil 130 includes an overlapping portion 131 overlapping with the first coil 120 and a non-overlapping portion 132 staggered with the first coil 120. The shielding member 140 includes: a first sub shielding member 141, covering the side, far away from the rear shell 111, of the first coil 120; and a second sub shielding member 142, covering the side, far away from the rear shell 111, of the non-overlapping portion 132.

Materials for the first sub shielding member 141 and the second sub shielding member 142 may be the same, and may also be different. The first sub shielding member 141 and the second sub shielding member 142 may be flexible films, and may also be rigid films. There are no specific limits made thereto in the examples of the present disclosure, and choices may be made according to a practical design.

FIG. 2 shows a cross-sectional view of terminal device 100, where the first sub shielding member 141 and the second sub shielding member 142 are arranged separately, to facilitate respectively arrangement in the body 110.

The first sub shielding member 141 may cover the first coil 120 and be bonded to the first coil 120, and the second sub shielding member 142 may also cover the second coil 130 and be bonded to the second coil 130. In another example, the first sub shielding member 141 is spaced from the first coil 120, and the second sub shielding member 142 is spaced from the second coil 130. A spacer, for example, a film layer, may be arranged between the first sub shielding member 141 and the first coil 120 to space the first sub shielding member 141 from the first coil 120. A spacer, for example, a film layer, may be arranged between the second sub shielding member 142 and the second coil 130 to space the second sub shielding member 142 from the second coil 130.

In an example, as shown in FIG. 1, the first sub shielding member 141 and the second sub shielding member 142 form an integrated structure. As such, manufacturing procedures are reduced, the shielding member 140 may be conveniently arranged in the body 110, and improvement in production efficiency is facilitated.

In an example, a thickness of a portion 143, opposite to the overlapping portion 121, of the shielding member 140 is greater than a thickness of a non-overlapping portion, opposite to the non-overlapping portion, of the shielding member 140. It can be understood that, as shown in FIG. 2, a thickness of a portion 143, opposite to the overlapping portion 121, of the first sub shielding member 141 is greater than a thickness of a non-overlapping portion, opposite to the non-overlapping portion, of the first sub shielding member 141. When the first coil 120 overlaps with the second coil 130 and thus a magnetic field is intensified, mutual interference with the external environment is easily generated. In such an arrangement manner of the present disclosure, effective shielding protection for the overlapping portions 121, 131 of the first coil 120 and the second coil 130 may be implemented by the shielding member 140.

Figure 3:
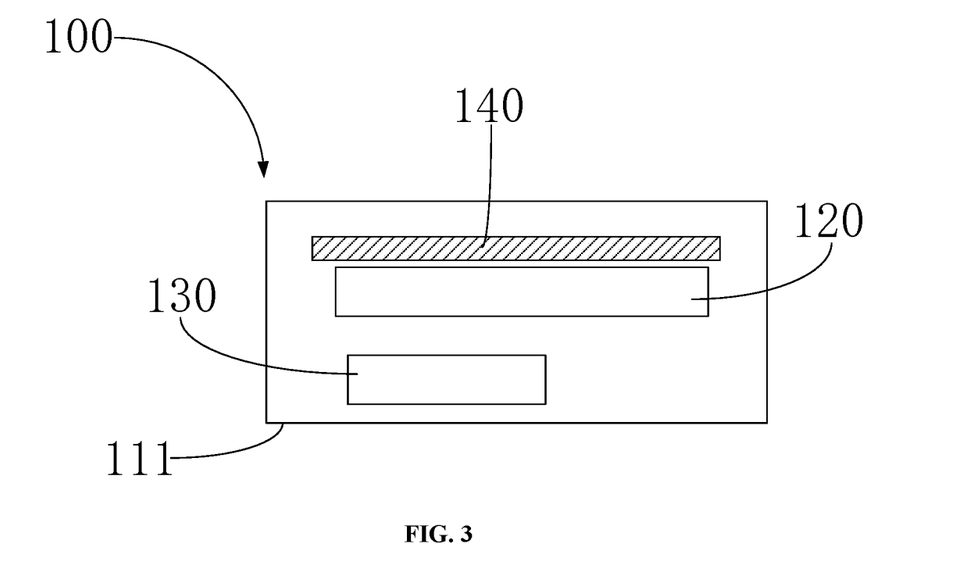
FIG. 3 is a cross-sectional view of a terminal device, according to an example of the present disclosure.

FIG. 3, a second example, shows a cross-sectional view of terminal device 100, the second coil 130 completely overlaps with the first coil 120, and the shielding member 140 covers the side, far away from the rear shell 111, of the first coil 120. In such case, the shielding member 140 is only required to be arranged on the side, far away from the rear shell 111, of the first coil 120.

For the two examples, a projection of the shielding member 140 on the first coil 120 may completely cover the first coil 120, and a projection of the shielding member 140 on the second coil 130 may completely cover the second coil 130. Therefore, effective shielding protection over the first coil 120 and the second coil 130 may be implemented by the shielding member 140. Of course, the projection of the shielding member 140 on the first coil 120 may extend beyond the first coil 120, and the projection of the shielding member 140 on the second coil 130 may extend beyond the second coil 130. Therefore, not only effective shielding protection for the first coil 120 and the second coil 130 can be implemented, but also shielding protection for other parts in the terminal device 100 is facilitated.

Figure 4:
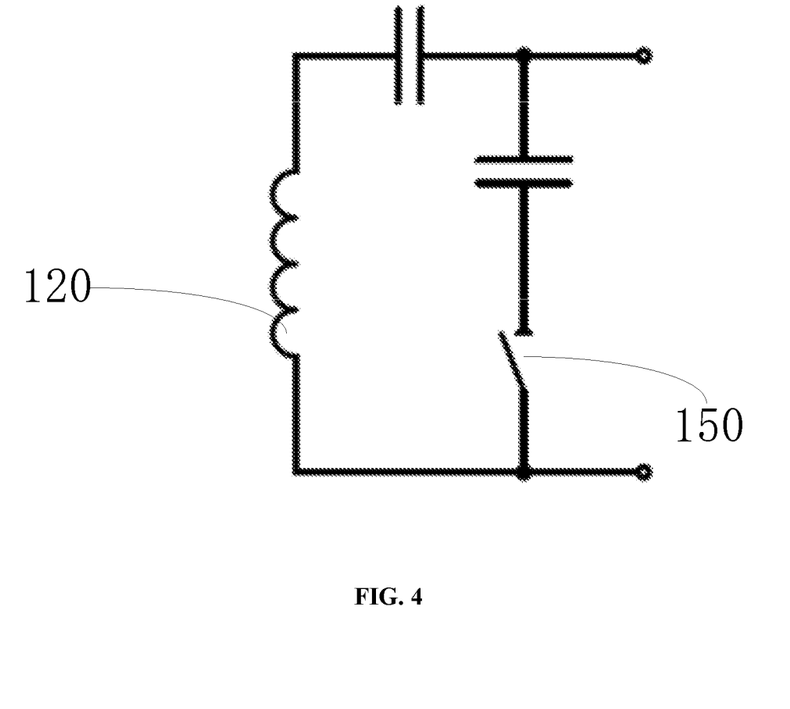
FIG. 4 is a diagram of a circuit where a first coil is located, according to an example of the present disclosure.

FIG. 4 shows a diagram of a circuit where a first coil 120 is located in terminal device 100 and further includes a first switch 150 arranged within the body 110. The first switch 150 is configured to control the first coil 120 to be energized and de-energized. Since there is no shielding member 140 arranged between the overlapping portions 121, 131 of the first coil 120 and the second coil 130 (as shown in FIG. 1 and FIG. 2), the first coil 120 and the second coil 130 inevitably interfere with each other. When the first coil 120 does not operate, the first switch 150 can be controlled to be turned off to ensure that no current is conducted to the first coil 120 and, thus the first coil 120 cannot affect the second coil 130 and other coils. When the first coil 120 operates, the first switch 150 is controlled to be turned on to enable the first coil 120 to operate. It is to be noted that a circuit including the first coil 120 is electrically connected with a control circuit, and the first switch 150 can be controlled through the control circuit to be turned on and turned off.

Figure 5:
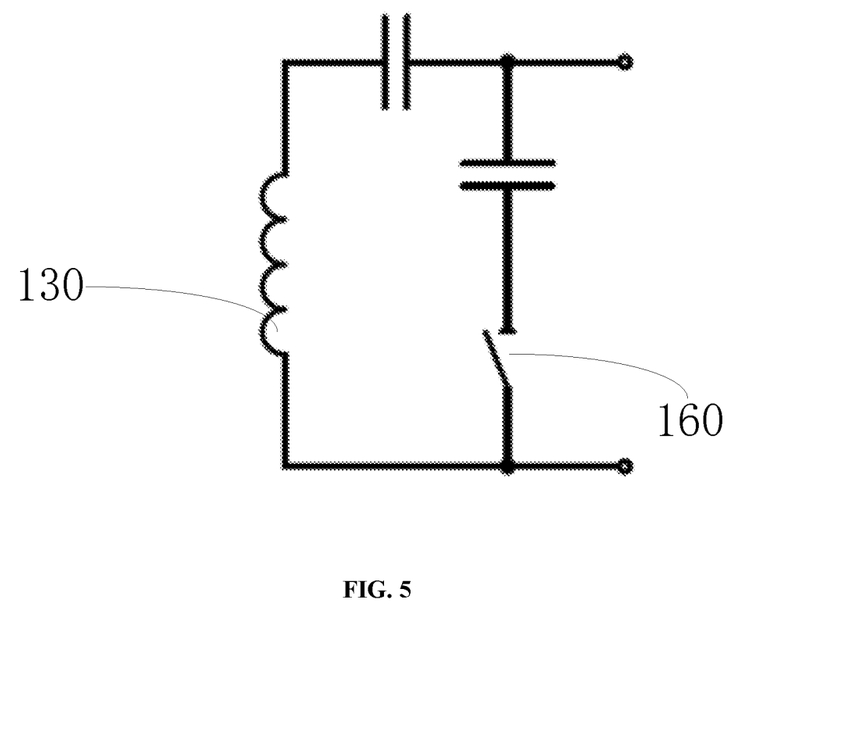
FIG. 5 is a diagram of a circuit where a second coil is located, according to an example of the present disclosure.

FIG. 5 shows a diagram of a circuit where a second coil 130 is located in the terminal device 100 and further includes a second switch 160 arranged in the body 110. The second switch 160 is configured to control the second coil 130 to be energized and de-energized. When the second coil 130 does not operate, the second switch 160 can be controlled to be turned off to ensure that no current is conducted to the second coil 130, and thus the second coil 130 cannot affect the first coil 120 or other coils. When the second coil 130 operates, the second switch 160 is controlled to be turned on to enable the second coil 130 to operate. Similarly, a circuit including the second coil 130 is electrically connected with the control circuit, and the second switch 160 can be controlled through the control circuit to be turned on and turned off.

In addition, one or more capacitors may further be arranged in the circuit including the first coil 120. The first coil 120 is matched with the one or more capacitors to form a resonant circuit. One or more capacitors may further be arranged in the circuit including the second coil 130. The second coil 130 is matched with the one or more capacitors to form a resonant circuit. By the resonant circuits, voltage waveform distortion may be improved, and failures of other circuits connected with the first coil 120 and other circuits connected with the second coil 130 may be avoided.

In the examples of the present disclosure, the number of the first coil 120 may be one or more, and the number of the second coil 130 may be one or more. When the numbers of the first coil 120 and the second coil 130 are more than or equal to 3, an arrangement manner for the shielding member 140 is similar to that in the abovementioned examples and will not be elaborated herein.

The terminal device 100 provided in the examples of the present disclosure is not limited in the functions of the first coil 120 and the second coil 130. When the first coil 120 and the second coil 130 are electrically connected and matched to realize an NFC function or a wireless charging function, or, when the first coil 120 has the NFC function and the wireless charging function, arrangement manners for the first coil 120, the second coil 130 and the shielding member 140 are similar to those in the abovementioned examples and will not be elaborated herein.

Figure 6:
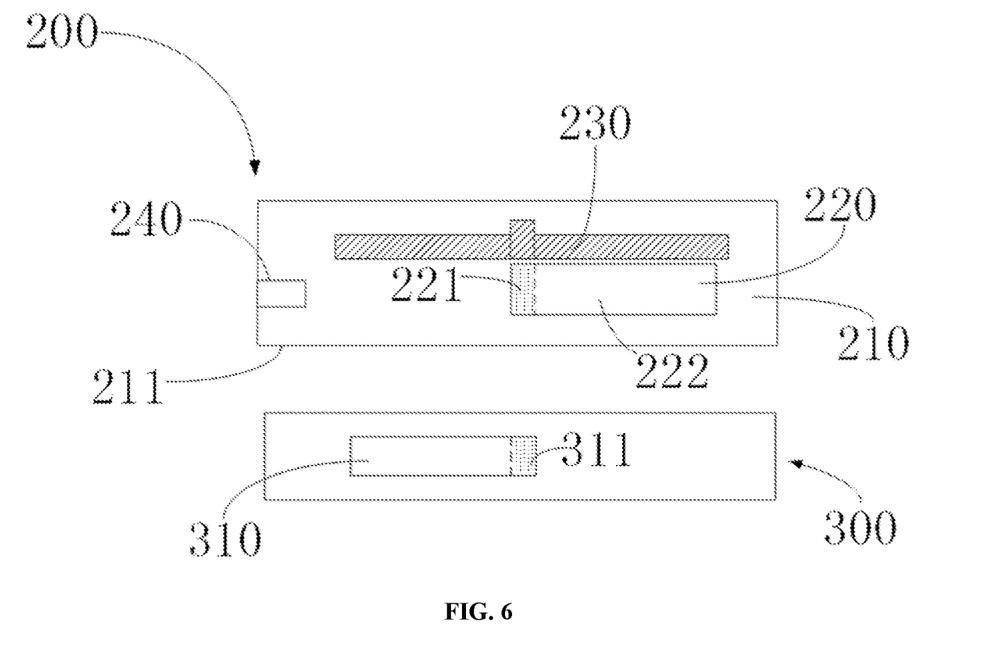
FIG. 6 is a cross-sectional view when a terminal device is matched with another device, according to an example of the present disclosure.

According to the second aspect of the examples of the present disclosure, a terminal device is provided. FIG. 6 shows a cross-sectional view when a terminal device is matched with another device in the terminal device 200 and includes a body 210, a first coil 220, a shielding member 230 and a first wireless charging interface 240. The body 210 includes a rear shell 211. The first coil 220 is located within the body 210. The shielding member 230 covers the side, far away from the rear shell 211, of the first coil 220. There is no shield between the first coil 220 and other coil. The first wireless charging interface 240 is formed within the body 210, and is configured to receive a current from a wireless charging coil 310 and/or configured to send a current to the wireless charging coil 310.

According to the terminal device 200 provided in the examples of the present disclosure, the shielding member 230 covers the side, far away from the rear shell 211, of the first coil 220 to implement shielding protection for the first coil 220. Moreover, there is no shield between the first coil 220 and the other coil, so that overlapping portions of the first coil 220 and the other coil may be prevented from shielding interference.

In the examples of the present disclosure, the first coil 220 may be an NFC coil, and the other coil may be the wireless charging coil 310.

In an example, as shown in FIG. 6, the wireless charging coil 310 is arranged in another device matched with the terminal device 200. For example, the wireless charging coil 310 is arranged in a protective shell 300 for wirelessly charging the terminal device 200.

The first wireless charging interface 240 is connected with a circuit in the terminal device 200. A current may be transmitted to the circuit in the terminal device 200 through the first wireless charging interface 240, and/or, the circuit in the terminal device 200 may transmit a current outside through the first wireless charging interface 240.

In an example, the first wireless charging interface 240 is a Mini USB interface, a Micro USB interface, a Dock interface, a Lightning® interface or a USB-Type C interface. The protective shell 300 is connected with the first wireless charging interface 240 of the terminal device 200 by use of a cable such as a charging wire, so that the wireless charging coil 310 may transmit a current to the first wireless charging interface 240, and/or, the first wireless charging interface 240 may transmit a current to the wireless charging coil 310. It is to be noted that the first wireless charging interface 240 may be a charging interface in the terminal device 200.

In an example, the first coil 220 includes an overlapping portion 221 overlapping with the other coil and a non-overlapping portion 222 staggered with the other coil. Referring to FIG. 6, a thickness of a portion 143, opposite to the overlapping portion 221, of the shielding member 230 is greater than a thickness of a non-overlapping portion, opposite to the non-overlapping portion 222, of the shielding member 230. When the first coil 220 overlaps with the wireless charging coil 310 and thus a magnetic field is intensified, mutual interference with the outside is easily generated. In such an arrangement manner, effective shielding protection for the overlapping portions 221, 311 of the first coil 220 and the wireless charging coil 310 may be implemented by the shielding member 230.

In an example, a projection of the shielding member 230 on the first coil 220 completely covers the first coil 220. Therefore, effective shielding protection for the first coil 220 may be implemented by the shielding member 230. Of course, the projection of the shielding member 230 on the first coil 220 may extend beyond the first coil 220 to implement shielding protection for other components in the terminal device 220.

Figure 7:
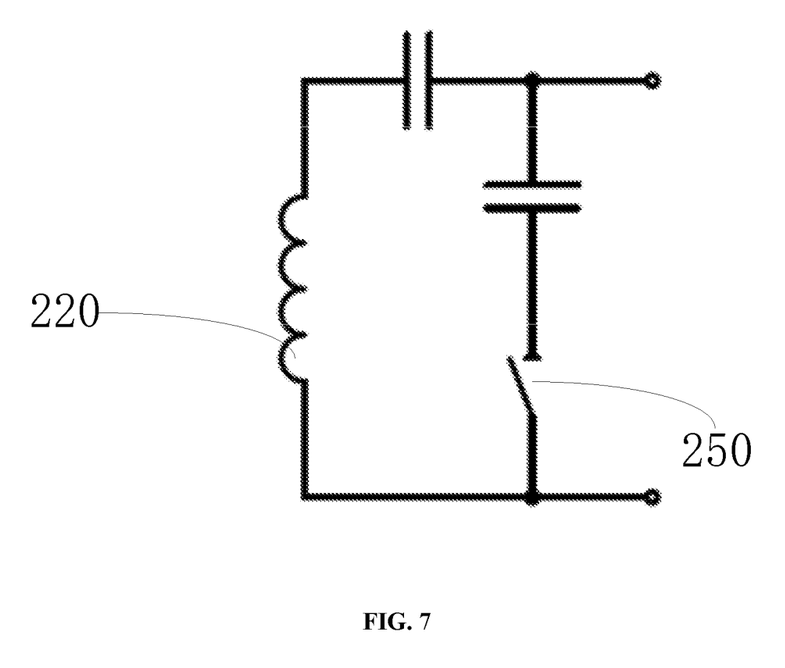
FIG. 7 is a diagram of a circuit where a first coil is located, according to an example of the present disclosure.

FIG. 7 shows a diagram of a circuit where a first coil is located in the terminal device 200 and further includes a first switch 250 arranged within the terminal device 200 and configured to control the first coil 220 to be energized and de-energized. When the first coil 220 does not operate, the first switch 250 can be controlled to be turned off to ensure that no current is conducted to the first coil 220, and thus the first coil 220 cannot affect the wireless charging coil 310 and the other coil. When the first coil 220 works, the first switch 250 is controlled to be turned on to enable the first coil 220 to operate. A circuit including the first coil 220 may be a resonant circuit, which may specifically refer to corresponding descriptions about the first coil 120 according to the first aspect of the present disclosure and will not be elaborated herein.

Figure 8:
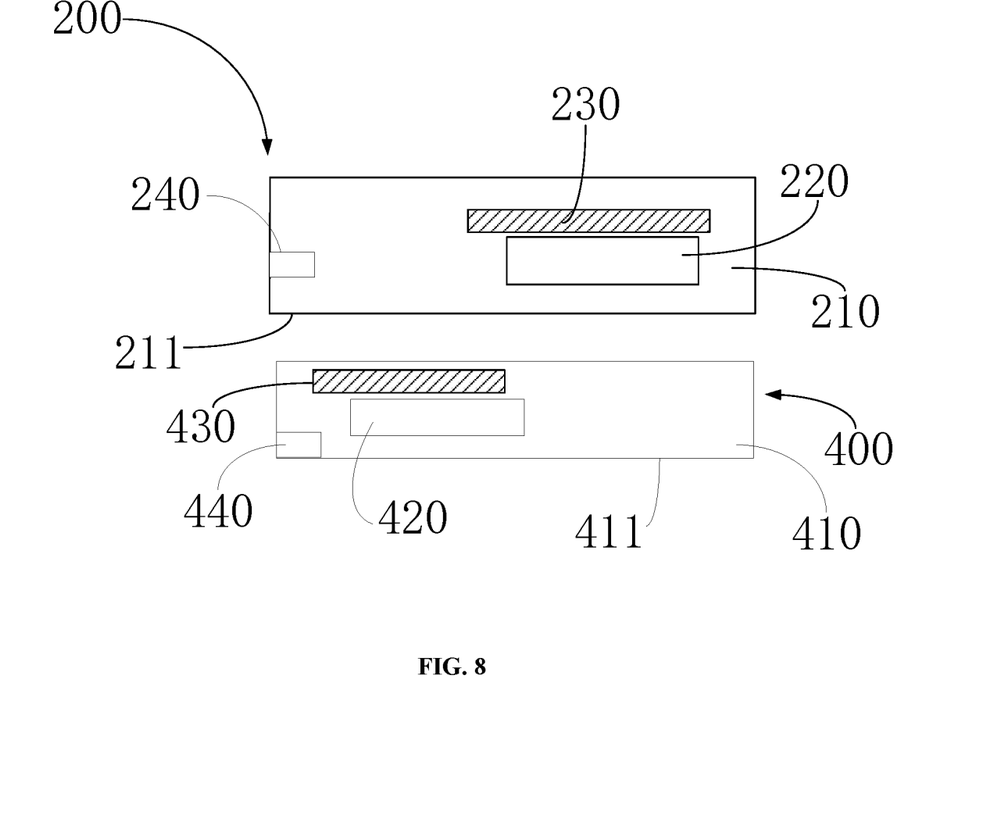
FIG. 8 is a cross-sectional view when a protective shell is matched with a terminal device, according to an example of the present disclosure.

According to the third aspect of the present disclosure, a protective shell is provided. FIG. 8 shows a cross-sectional view of the protective shell 400 matched with terminal device 200, the protective shell 400 includes a shell 410, a wireless charging coil 420, a shielding member 430 and a second wireless charging interface 440. The shell 410 includes an outer surface 411. The wireless charging coil 420 is located in the shell 410 and adjacent to the side of the outer surface 411. The shielding member 430 covers the side, far away from the outer surface 411, of the wireless charging coil 420. Coverage of the shield is located in the working face of the wireless charging coil 420 and outside an overlapping area between the wireless charging coil 420 and other coil. There is no shield between the wireless charging coil 420 and the other coil. The second wireless charging interface 440 is formed in the shell 410, and is configured to receive a current from the wireless charging coil 420 and/or configured to send a current to the wireless charging coil 420.

According to the protective shell 400 provided in the examples of the present disclosure, the shielding member 430 covers the side, far away from the outer surface 411, of the wireless charging coil 420 to implement shielding protection for the wireless charging coil 420. Moreover, the coverage of the shielding piece 430 is located in the working surface of the wireless charging coil 420 and outside an overlapping area between the wireless charging coil 420 and the other coil. There is no shield between the wireless charging coil 420 and the other coil, so that the overlapping portions of the wireless charging coil 420 and the other coil may be prevented from shielding interference.

In an example, the coverage of the shielding member 430 is as follows: the coverage of the shielding member is located in the working surface of the wireless charging coil 420 and outside an overlapping area between the wireless charging coil 420 and the other coil arranged in the protective shell 400; and/or, the coverage of the shielding member is located in the working surface of the wireless charging coil 420 and outside an overlapping area between the wireless charging coil 420 and the other coil arranged in the other device matched with the protective shell 400. The other device may be a terminal device.

Figure 9:
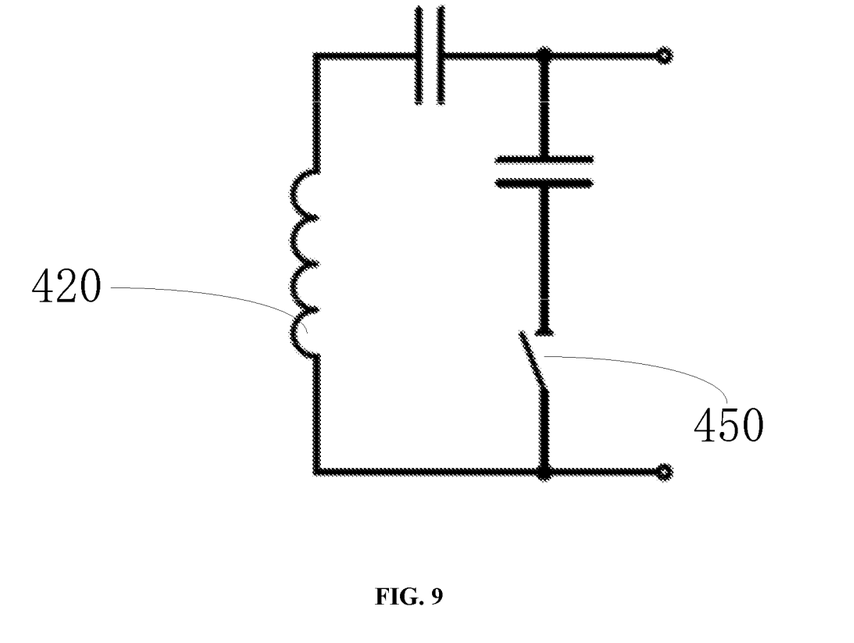
FIG. 9 is a diagram of a circuit where a wireless charging coil is located, according to an example of the present disclosure.

FIG. 9 shows a diagram of a circuit where a wireless charging coil is located in the protective shell 400 and further includes a second switch 450 arranged in the shell 410 and configured to control the wireless charging coil 420 to be energized and de-energized. When the wireless charging coil 420 does not operate, the second switch 450 can be controlled to be turned off to ensure that no current is conducted to the wireless charging coil 420, and thus the wireless charging coil 420 cannot affect the other coil. When the wireless charging coil 420 operates, the second switch 450 is controlled to be turned on to enable the wireless charging coil 420 to operate.

The second wireless charging interface 440 is connected with a circuit in the protective shell 400. A current may be transmitted to the circuit in the protective shell 400 through the second wireless charging interface 440, and/or, the circuit in the protective shell 400 may transmit a current outside through the second wireless charging interface 440. In an example, the second wireless charging interface 440 is a Mini USB interface, a Micro USB interface, a Dock interface, a Lightning® interface or a USB-Type C interface. The terminal device is connected with the second wireless charging interface 440 of the protective shell 400 by a cable such as a charging wire, so that the wireless charging coil 420 may transmit a current to the second wireless charging interface 440, and/or, the second wireless charging interface 440 may transmit a current to the wireless charging coil 420.

Figure 10:
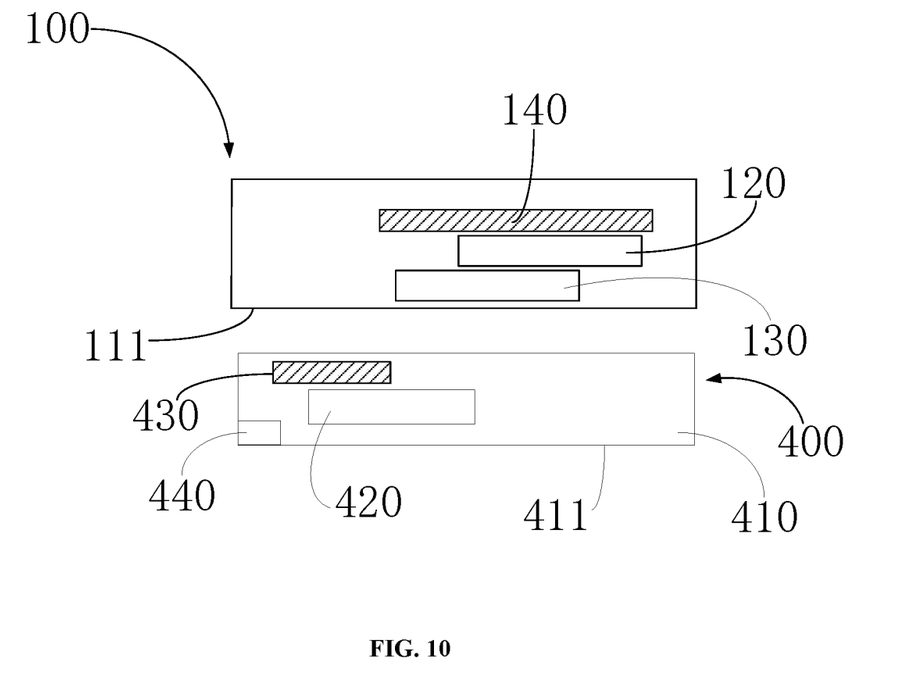
FIG. 10 is a cross-sectional view when a terminal device is matched with a protective shell, according to an example of the present disclosure.

According to a fourth aspect of the present disclosure, an electronic system is provided. FIG. 10 shows a cross-sectional view when a terminal device 100 is matched with a protective shell 400, the electronic system includes a terminal device 100 according to the first aspect of the present disclosure and a protective shell 400 according to the third aspect of the present disclosure. The terminal device 100 is used with the protective shell 400. A rear shell 111 of the terminal device 100 is adjacent to or fits closely with the side, far away from an outer surface 411, of the protective shell 400. The terminal device 100 is described by the descriptions in the first aspect of the present disclosure, the protective shell 400 is described by the descriptions in the third aspect of the present disclosure, and no more elaborations will be made herein. It is ensured that no shield is between a first coil 120 and second coil 130 of the terminal device 100 and a wireless charging coil 420 of the protective shell 400.

In the case that the second coil 130 of the terminal device 100 is also a wireless charging interface, a charging interface is formed in a body 110 of the terminal device 100, and the terminal device 100 may be wirelessly charged in the following two manners.

Manner I: the protective shell 400 is used to wirelessly charge the terminal device 100. A second switch 150 in a circuit including the wireless charging coil in the terminal device 100 is controlled to be turned off to stop the operation of the wireless charging coil in the terminal device 100. A second switch 450 in a circuit including the wireless charging coil 420 in the protective shell 400 is turned on, and a second wireless charging interface 440 of the protective shell 400 is electrically connected with the charging interface of the terminal device 100 by using a cable such as a charging wire, to enable the protective shell 400 to wirelessly charge the terminal device 100.

Manner II: the wireless charging coil in the terminal device 100 is used to wirelessly charge the terminal device 100. A control chip may be arranged in the protective shell 400, a control signal is sent to the control chip through the terminal device 100, and the control chip controls the second switch 450 in the circuit including the wireless charging coil 420 in the protective shell 400 to be turned off, so that the protective shell 400 no longer wirelessly charge the terminal device 100. The terminal device 100 controls the second switch 150 in the circuit including the wireless charging coil within the terminal device to be turned on, to wireless charge the terminal device 100.

According to a fifth aspect of the present disclosure, an electronic system is provided. As shown in FIG. 8, the electronic system includes a terminal device 200 according to the second aspect of the present disclosure and a protective shell 400 according to the third aspect of the present disclosure. The terminal device 200 is described by the descriptions in the second aspect of the present disclosure, the protective shell 400 is described by the descriptions in the third aspect of the present disclosure. Arrangement positions of a shielding member 230 in the terminal device 200 and a shielding member 430 in the protective shell 400 may refer to the corresponding descriptions, and no more elaborations will be made herein. It is ensured that no shield is between first coil 220 of the terminal device 200 and a wireless charging coil 420 of the protective shell 400.

It is to be noted that the terminal device 200 does not include a wireless charging coil, the protective shell 400 includes a wireless charging coil 420, and the protective shell 400 is used to wirelessly charge the terminal device 200. A second wireless charging interface 440 of the protective shell 400 is connected with a first wireless charging interface 240 of the terminal device 200 through a cable such as a charging wire, to enable the protective shell 400 to wirelessly charge the terminal device 200.

In an example, the second coil may include an overlapping portion overlapping with the first coil and a non-overlapping portion staggered with the first coil. The shielding member may include a first sub shielding member, covering the side, far away from the rear shell, of the first coil, and a second sub shielding member, covering the side, far away from the rear shell, of the non-overlapping portion.

In an example, the first sub shielding member and the second sub shielding member may be arranged separately.

In an example, the first sub shielding member and the second sub shielding member may form an integrated structure.

In an example, a thickness of a portion, opposite to the overlapping portion, of the shielding member may be greater than a thickness of a portion, opposite to the non-overlapping portion, of the shielding member.

In an example, the second coil may completely overlap with the first coil, and the shielding member may cover the side, far away from the rear shell, of the first coil.

In an example, a projection of the shielding member on the first coil may completely cover the first coil, and a projection of the shielding member on the second coil may completely cover the second coil.

In an example, the terminal device may further include: a first switch arranged in the body, the first switch being configured to control the first coil to be energized and de-energized.

In an example, the terminal device may further include: a second switch arranged in the body, the second switch being configured to control the second coil to be energized and de-energized.

In an example, the wireless charging coil may be arranged in another device matched with the terminal device.

In an example, the first coil may include an overlapping portion overlapping with the other coil and a non-overlapping portion staggered with the other coil. A thickness of a portion, opposite to the overlapping portion, of the shielding member may be greater than a thickness of a portion, opposite to the non-overlapping portion, of the shielding member.

In an example, a projection of the shielding member on the first coil may completely cover the first coil.

In an example, the terminal device may further include a first switch arranged in the terminal device and configured to control the first coil to be energized and de-energized.

In an example, the first wireless charging interface may be a Mini Universal Serial Bus (USB) interface, a Micro USB interface, a Dock interface, a Lightning® interface or a USB-Type C interface.

In an example, the coverage may be as follows:
the coverage is located in the working face of the wireless charging coil and outside an overlapping area between the wireless charging coil and the other coil arranged in the protective shell; and/or
the coverage is located in the working face of the wireless charging coil and outside an overlapping area between the wireless charging coil and the other coil arranged in another device matched with the protective shell.

In an example, the protective shell may further include a second switch arranged in the shell and configured to control the wireless charging coil to be energized and de-energized.

In an example, the second wireless charging interface may be a Mini USB interface, a Micro USB interface, a Dock interface, a Lightning® interface or a USB-Type C interface.

The terminal device provided in examples of the present disclosure at least has the following beneficial effects.

The shielding member covers the sides, far away from the rear shell, of the first coil and the second coil, so that shielding protection for the first coil and the second coil may be implemented. Moreover, the shielding member is located outside the overlapping area between the first coil and the second coil, and there is no shield between the first coil and the second coil, so that the overlapping portion of the first coil and the second coil may be prevented from interference of the shielding member.

The above is only some examples of the present disclosure and not intended to limit the present disclosure. Any modifications, equivalent replacements, improvements and the like made within the spirit and principle of the present disclosure shall fall within the scope of protection of the present disclosure.

What is claimed is:
1. A terminal device, comprising:
a body, wherein the body comprises a first end and a second end;
a first coil, wherein the first coil is located within the body;
a second coil, wherein the second coil at least partially overlaps the first coil, and is located between the first coil and the first end, the second coil is spaced apart from the first coil in a direction from the first end to the second end; and a shielding member, wherein the shielding member overlaps the first coil and the second coil, and is between the second end and the first coil, wherein the second coil comprises an overlapping portion and a non-overlapping portion wherein the overlapping portion overlaps the first coil, the shielding member comprises a first sub shielding member and a second sub shielding member, wherein the first sub shielding member overlaps the first coil and the second sub shielding member overlaps the non-overlapping portion of the second coil, and the first sub shielding member comprises an overlapping portion and a non-overlapping portion, wherein the overlapping portion of the first sub shielding member overlaps overlapping portion of the first coil, the non-overlapping portion of the first sub shielding member is opposite to the non-overlapping portion of the first coil, and a thickness of the overlapping portion of the first sub shielding member is greater than a thickness of the non-overlapping portion of the first sub shielding member.

2. The terminal device of claim 1, wherein the first sub shielding member and the second sub shielding member are arranged to be spaced apart from each other.

3. The terminal device of claim 1, wherein the first sub shielding member and the second sub shielding member form an integrated structure.

4. The terminal device of claim 1, wherein the second coil completely overlaps the first coil, wherein the shielding member is located between the second end and the first coil, and the shielding member overlaps the first coil.

5. The terminal device of claim 1, wherein the shielding member completely overlaps the first coil and the second coil.

6. The terminal device of claim 1, further comprising: a first switch arranged in the body, the first switch being configured to control the first coil to be energized and de-energized.

7. The terminal device of claim 1, further comprising: a second switch arranged in the body, the second switch being configured to control the second coil to be energized and de-energized.

8. A terminal device, comprising:
a body, comprising a first end and a second end;
a first coil, located within the body;
a second coil, wherein the second coil at least partially overlaps the first coil, and is located between the first coil and the first end, the second coil is spaced apart from the first coil in a direction from the first end to the second end;
a shielding member, wherein the shielding member overlaps the first coil and the second coil, and is between the second end and the first coil; and
a first wireless charging interface, formed in the body and configured to receive a current from a wireless charging coil,
wherein the second coil comprises an overlapping portion and a non-overlapping portion wherein the overlapping portion overlaps the first coil,
the shielding member comprises a first sub shielding member and a second sub shielding member, wherein the first sub shielding member overlaps the first coil and the second sub shielding member overlaps the non-overlapping portion of the second coil, and the first sub shielding member comprises an overlapping portion and a non-overlapping portion, wherein the overlapping portion of the first sub shielding member overlaps overlapping portion of the first coil, the non-overlapping portion of the first sub shielding member is opposite to the non-overlapping portion of the first coil, and a thickness of the overlapping portion of the first sub shielding member is greater than a thickness of the non-overlapping portion of the first sub shielding member.

9. The terminal device of claim 8, wherein the wireless charging coil is arranged in another device matched with the terminal device.

10. The terminal device of claim 8, wherein the first coil comprises an overlapping portion overlapping with a second coil and a non-overlapping portion staggered with the second coil; and a thickness of a portion, opposite to the overlapping portion, of the shielding member is greater than a thickness of a portion, opposite to the non-overlapping portion, of the shielding member.

11. The terminal device of claim 8, wherein the shielding member completely overlaps the first coil.

12. The terminal device of claim 8, further comprising: a first switch arranged in the terminal device and configured to control the first coil to be energized and de-energized.

13. The terminal device of claim 8, wherein the first wireless charging interface is either a Mini Universal Serial Bus (USB) interface, a Micro USB interface, a Dock interface or a USB-Type C.

14. A terminal device, comprising:
a body, comprising a first end and a second end;
a first coil, located within the body;
a second coil, wherein the second coil at least partially overlaps the first coil, and is located between the first coil and the first end, the second coil is spaced apart from the first coil in a direction from the first end to the second end;
a shielding member, wherein the shielding member overlaps the first coil and the second coil, and is between the second end and the first coil; and
a first wireless charging interface, formed in the body and configured to send a current to a wireless charging coil,
wherein the second coil comprises an overlapping portion and a non-overlapping portion wherein the overlapping portion overlaps the first coil,
the shielding member comprises a first sub shielding member and a second sub shielding member, wherein the first sub shielding member overlaps the first coil and the second sub shielding member overlaps the non-overlapping portion of the second coil, and
the first sub shielding member comprises an overlapping portion and a non-overlapping portion, wherein the overlapping portion of the first sub shielding member overlaps overlapping portion of the first coil, the non-overlapping portion of the first sub shielding member is opposite to the non-overlapping portion of the first coil, and a thickness of the overlapping portion of the first sub shielding member is greater than a thickness of the non-overlapping portion of the first sub shielding member.

\* \* \* \* \*